United States Patent [19]

Choyke et al.

[11] 4,142,006
[45] Feb. 27, 1979

[54] METHOD OF MAKING A HIGH POWER LASER MIRROR

[75] Inventors: Wolfgang J. Choyke, Pittsburgh; Richard A. Hoffman, Export, both of Pa.

[73] Assignee: Westinghouse Electric Corp., Pittsburgh, Pa.

[21] Appl. No.: 661,921

[22] Filed: Feb. 27, 1976

Related U.S. Application Data

[63] Continuation-in-part of Ser. No. 481,268, Jun. 20, 1974, abandoned.

[51] Int. Cl.$^2$ .............................................. G02B 5/08
[52] U.S. Cl. .................................. 427/162; 427/248 J; 427/292; 427/294; 427/367
[58] Field of Search ................ 427/166, 53, 248 J, 427/292, 294, 367

[56] References Cited

U.S. PATENT DOCUMENTS

| | | | |
|---|---|---|---|
| 2,647,441 | 8/1953 | Boydston et al. | 88/105 |
| 2,988,456 | 6/1961 | Fairbanks et al. | 117/35 |
| 3,222,438 | 12/1965 | Parr et al. | 264/66 |
| 3,601,471 | 8/1971 | Seddon | 350/166 |

*Primary Examiner*—Bernard D. Pianalto
*Attorney, Agent, or Firm*—R. T. Randig

[57] ABSTRACT

Method of making a high power laser mirror. Essentially the mirror consists of a refractory composition substrate which is polished to an optical finish and overcoated with a high reflectivity metal and a dielectric film disposed to cover the high reflectivity metal.

The method includes the hot pressing of the refractory composition, especially silicon carbide, to form a substrate following which an optical finish is polished on one surface thereof. Thereafter, a metal film with a high reflectivity is applied to cover the optical surface and then a dielectric film is deposited over the high reflectivity metal film. Both films are deposited employing process of vacuum evaporation for deposition on the substrate. As thus combined, the mirror exhibits low optical absorptivity, high thermal conductivity, low weight, and low coefficient of thermal expansion. Since the substrate is formed of a hard refractory composition, an excellent optical finish can be polished on the surface thereof.

11 Claims, 1 Drawing Figure

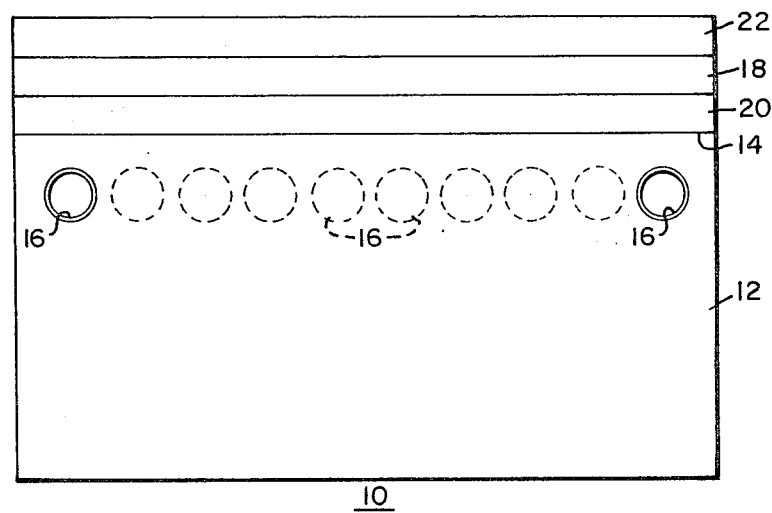

METHOD OF MAKING A HIGH POWER LASER MIRROR

This application is a continuation-in-part of application Ser. No. 481,268 filed June 20, 1974 and now abandoned.

BACKGROUND OF THE INVENTION

1. Field of the Invention

The present invention is directed to a high powered laser mirror and the method of making the same, said mirrors special utility with respect to carbon dioxide gas lasers operating at a wavelength of 10.6 microns, where continuous power densities in excess of about 30 kilowatts per square centimeter are expected. As typical examples, such lasers can be employed in sealing pressurized nuclear fuel elements and may find use in the future for the generation of power by means of laser induced fusion.

2. Description of the Prior Art

Additionally, the invention also relates to laser mirrors for use in the ultraviolet regions especially in the range between about 500Å and about 1000Å and such mirrors are characterized by exceedingly low light scatter of the order of about 1% and less.

The mirror which is employed in either continuous or pulsed laser system, is highly critical in determining the efficiency. The duration of laser pulses is improved by use of such mirror. This results from the fact that heating is caused by absorbed laser energy which in turn is responsible for degradation and destruction of the laser mirror because the heat causes distortion. Ideally, the laser should have low optical absorptivity at the laser wavelength and high thermal conductivity to dissipate the energy which is absorbed by the mirror. Evaporated films of silver, gold, and copper have very low absorptivity in the visible and near infrared spectral regions and it has been found that the absorptivity of the film is a function of the purity of the metal and the roughness of the substrate upon which the film is deposited. The absorptivity of the laser energy arising from surface roughness has been termed the "anomalous skin effect." The micro-roughness of the film surface can cause diffuse scattering of the conduction electrons at the surface thereby giving rise to an increase in the absorptivity which can be as large as 50% of the absorptivity for a smooth surface. Prior art laser mirrors have absorptivities of about 1% when utilizing evaporated films of silver or gold deposited on copper substrates.

It has also been found that with high power laser mirrors efficiency is destroyed by reason of a lowered figure of merit which has been assigned to the prior art mirrors. The figure of merit appears to be an all encompassing value but is particularly susceptible to differential thermal expansion caused by non-uniform laser heating. Apparently, prior art mirrors in which copper or molybdenum are employed as the substrates appear to be particularly susceptible which is believed due in part to the high value for the thermal expansion coefficient of copper or molybdenum.

SUMMARY OF THE INVENTION

The laser mirror of the present invention comprises a refractory material and, preferably, a refractory composition of silicon carbide or silicon nitride and mixtures thereof, which has been hot pressed into a suitable substrate form. One surface of the hot pressed substrate is polished to achieve an optical finish having an ultimate roughness between about 7 and about 10 angstrom units RMS. The optical surface is then overcoated with a film of high reflectivity metal which is selected from the group comprising silver, gold, and copper and thereafter a transparent dielectric film, preferably of lanthanum fluoride, is disposed to cover the high reflectivity metal. As thus assembled, the mirror shows improved operating characteristics over the prior art mirrors.

Another method of fabricating the laser mirror involved the use of chemical vapor desposition techniques which can be employed to produce layers of SiC of up to ⅛" in thickness on hot pressed SiC which can be polished to an excellent optical finish. When utilized in the ultraviolet range the polished optical reinforce would not be coated. Such mirrors have been made and exhibit a normal incident reflectivity at 700Å of about 40% composed to 10% for platinum which is commonly used for ultraviolet mirrors.

The method of making the mirror of the present invention includes the hot pressing of silicon carbide or silicon nitride or mixtures thereof to achieve a density approaching that of the theoretical density. Thereafter one surface of a suitable substrate is subjected to a polishing operation. Typically ¼ micron diamond grit is employed as polishing medium for obtaining the optical finish. Other techniques such as bowl feed polishing may be used to obtain optical surfaces characterized by an ultimate surface roughness of between 7 and 10 angstrom units RMS. The optical surface is overlaid with a metal of high reflectivity which is selected from the goup comprising silver, gold and copper and said metal is vapor deposited as a thin film on the optical surface, said thin film having a thickness within the range between about 1,500 and about 8,000 angstrom units. This metal film is mostly suitable accomplished by means of vacuum evaporation. Thereafter, a thin transparent dielectric film, preferably of lanthanum fluoride, is disposed to cover the high reflectivity film, the dielectric film having a thickness within the range between about 300 and about 1,500 angstrom units. As thus assembled, the mirror displays very low absorptivity and a high figure of merit.

Silicon carbide can be produced by chemical vapor deposition techniques in a substantially pure state. Consequently, reaction bonded silicon carbide containing about 4% to about 9% silicon which material is exceedingly difficult to polish can be employed as a laser mirror substrate. This permits the easy formation of cooling channels and surface curvature as well as difficult shapes in the green state prior to firing and thereafter the reaction bonded silicon carbide substrate can be coated with chemical vapor deposited silicon carbide thereon the latter being optically polished for a laser mirror. Such techniques resulted in negligible scattering from a heliumneon laser beam.

BRIEF DESCRIPTION OF THE DRAWING

The single FIGURE of the drawing illustrates the various components assembled into the form of a laser mirror.

DESCRIPTION OF THE PREFERRED EMBODIMENT

Referring now to the drawing there is illustrated generally at 10 a high power laser mirror which consists of substrate 12 formed of a refractory material and having one face 14 thereof polished to an optical finish. In order to improve the figure of merit exhibited by the substrate 12, the substrate may be provided with a plurality of cooling channels 16 which are disposed adjacent to the flat optical surface 14, for passage of a cooling fluid through the substrate, with a suitable inlet and outlet of the cooling fluid the removal therefrom.

A highly reflective thin film of metal 18 having preferably a high heat conductivity is disposed to cover the optical surface 14. In order to improve the adhesion of the highly reflective film 18 to the substrate 12 it is sometimes advantageous to interpose therebetween another thin film 20 of a metal such as chromium. If this intermediate layer is thick enough it may provide the two-fold function of improving the adhesion of the highly reflective thin film 18 to the substrate 12 on the optical surface 14 and also the additional thin film 20 will aid in providing a finer finish to the polished optical surface provided suitable precautions are followed as are well konwn in the art.

Since the highly reflective film 18 of metal which is preferably selected from the group consisting of silver, gold, and copper may have a tendency to tarnish or react with the components of the atmosphere, a transparent dielectric film 22 is disposed to cover the highly reflective film 18. Preferably the transparent dielectric film 22 is formed of a hard composition such as lanthanum fluoride. As thus asembled and with the proper polishing and care applied to each of the individual layers, a high power laser mirror is obtained which will have a high figure of merit, low optical absorptivity, and good thermal conductivity, such that said laser mirror can be employed in such applications as the laser fusion generation of power.

More specifically, the substrate material of the present invention is most advantageously produced from silicon carbide or silicon nitride or mixtures of silicon carbide and silicon nitride either with or without certain additives and binders. For example, boron, aluminum oxide, magnesium oxide, silicon, and other additives are contemplated which may enhance the hot pressibility, maintain a fine grain size, or aid in obtaining a final product that much more closely approximates the theoretical density of the material. Typically, substrate material such as silicon carbide or silicon nitride possesses the very important characteristic of high thermal conductivity. In this respect, hot pressed silicon carbide has the thermal conductivity of about 2 watts per centimeter per degree Kelvin at room temperature compared with the value of about 4 watts per centimeter per degree Kelvin for copper. This value is higher than that of many other metals including molybdenum. In addition, the thermal conductivity of silicon carbide increases faster with decreasing temperature as compared with copper so that its thermal conductivity will be higher than that of copper if the mirror is cooled somewhat below room temperature using various cooling fluids. It is for this reason that the cooling channels, as has been described hereinbefore, are usually fabricated within the substrate and are preferably placed adjacent the surface upon which the optical finish will be polished. p It will also be appreciated that the formed substrate will exhibit a density in excess of 90% of theoretically especially where cooling channels are frabricated therein. In this respect it has been found that an advantageous method for forming such substrates, having cooling channels adjacent to one surface thereof fabricated within the substrate, is to formulate or design the substrate from the desired material and employ graphite as a core during the green pressing of the powdered refractory materials. Thereafter, the silicon carbide or silicon nitride may be reaction sintered with the graphite core in place to form a dense reacted material having the desired configuration with the graphite in place within the reacted material which will ultimately form the laser mirror substrate. The graphite may then be removed by reacting with hot air, oxygen or in any other convenient manner.

Alternatively, it has been found that mating parts of the cooling channel can be initially green pressed about a core forming the cooling channel, in which the green pressed compact has a parting line along the plane passing through the axis of the cooling channel so that the green pressed compacts may be separated and the core may be removed intact and thereafter compacts can be remated to form the cooling channels and reaction sintered or hot pressed to form the substrate having the cooling channel fabricated therein. It will of course be appreciated that the same substrate can be employed in a laser mirror without the necessity of utilizing fabricated cooling channels within the substrate.

Preferably, the material of the substrate is fabricated from high purity, small grain, and preferably cubic powders of the respectively employed raw refractory materials. Using these, the thermal conductivity which is exhibited by the compacted substrate material will approach that of a single crystal, which in the case of silicon carbide is about 4.9 watts per centimeter degree Kelvin. It will be appreciated that unless the substrate material has a high thermal conductivity, the figure of merit exhibited by the finished laser mirror will be substantially inferior to presently known commercially available laser mirrors.

Commensurate with the high conductivity and improved figure of merit, the substrate material must exhibit a low thermal expansion coefficient. In this respect, it should be noted that the thermal coefficient of expansion of silicon carbide at room temperature is about $4.3 \times 10^{-6}$ compared to $16.8 \times 10^{-6}$ for copper which has been employed in the past as a substrate material. Thus, with the combination of high conductivity and low thermal expansion coefficient, less thermal distortion of the mirror would occur for a given absorptivity in comparison with the utilization of prior art materials for substrates, the most notable of which are copper and quartz.

Moreover, when it is considered that hot pressed silicon carbide or silicon nitride or mixtures thereof have a hardness of in excess of about 9 on the moh scale, the substrate will be much more durable and damage-resistant and also will permit the attainment of a better finish to the optical surface to be ground thereon than is feasible with such prior art materials as copper or molybdenum. Thus the combination of high thermal stability, high thermal shock resistance, and the excellent corrosion resistance of the substrate material, will make a substrate formed of such material exhibit vastly superior properties compared to those of the prior art materials. In addition, the density of hot pressed silicon carbides for example, is about 3 grams per cubic centimeter and as a result great weight savings are attained since the density of copper is about 3 times as great. Thus, it will be seen that the weight savings can be realized where large-size mirrors are involved such as are envisaged in the laser fusion generation of power.

The substrate material is provided with an optical finish on one surface thereof and most advantageously this may be done by polishing the substrate material employing diamond grit on a pitch lap or by bowl feed polishing. Excellent results have been obtained by polishing the optical surface employing diamond grit having a particle size of about ¼ to ½ micron. Utilizing this technique, a 2 inch diameter substrate was polished to provide an optical surface of better than 1/10 wavelength of visible light after a few hours of grinding and polishing.

It is of course understood that an intermediate layer of a metal such as for example nickel or chromium can be interposed on the optical surface and such coating may be utilized for a variety of reasons, including better adhesion of the metal of high reflectivity to the substrate and/or as an aid in producing an ultrasmooth finish to the optical surface itself. In general, such intermediate layers seldom exceed about 5 mils in thickness and are preferably placed on the surface by means of an electroless deposit employing technology and as vacuum deposition which is well known in the art.

With the substrate prepared and the provision of an optical surface thereon as described hereinbefore, a thin film of a highly reflective metal is deposited to cover the optical surface for the purpose of obtaining the high degree of reflectivity necessary for a laser mirror. For this, it has been found that a thin film of a metal selected from the group consisting of copper, silver, and gold may be placed on the optical surface, said thin film having a thickness within the range between about 1500 angstrom units and about 5,000 angstrom units. The thin film must have the property of providing a high degree of reflectivity and yet having an excellent thermal conductivity so as to dissipate any heat through the substrate and thereby improve the figure of merit attainable with the optical mirror.

In the example set forth hereinafter, it will be shown that a thin film of about 3,000 angstrom units in thickness has provided the reflectivity necessary in a laser mirror. The thin films have been placed on the optical surface by assembling the substrate and the desired metal of high reflectivity within a vacuum chamber and thereafter evacuating a system to the desired low pressure level. Improved results can be obtained where all of the materials which form the various coatings and which are subjected to the vacuum evaporating process are heated to a temperature in excess of about 100° C. to eliminate any water vapor from the substrate or any of the materials which are utilized. Thereafter, and while the materials are subject to the vacuum environment, the metal to be deposited is evaporated for deposition on the substrate. Typically, the evaporation rate is about 1,500 angstroms per second.

It will be appreciated that where copper or silver are employed, it may be desirable to provide the highly reflective thin film of metal with a protective surface so as to prevent the surface of the silver or copper from atmospheric attack, either through oxidation, sulfidation, or in any other manner. This is accomplished by depositing a transparent dielectric film which covers the thin film of the highly reflective metal and such transparent dielectric film is also produced by means of vacuum evaporation without exposing the reflective film to the atmosphere employing the same apparatus in which the metal of high reflectivity was deposited on the substrate. Advantageously, it has been found that such a thin film may comprise lanthanum fluoride which is hard and durable yet does not introduce any appreciable absorption at the desired wavelength of mirror operation. Other materials which may be used as a protective film include thorium fluoride and lead fluoride. The transparent dielectric is usually deposited to have a thickness within the range between about 500 and about 2,000 angstrom units, onto the substrate held at about 100° C. using an evaporation rate of about 20 angstroms per second.

EXAMPLES

In order to more clearly demonstrate the method of the present invention, a laser mirror was prepared in accordance with the following description: A graphite die was machined in such a shape as to produce a water-cooling channel for a 2 inch diameter by ½ inch thick silicon carbide disc. The graphite was ¼ × ¼ in cross-section and a 3/64 inch diameter air hole was provided at its center. This graphite die acted as a core and was thereafter burnt out following the hot pressing of silicon carbide to the 2 inch diameter by ½ inch in thickness substrate. The surface most closely adjacent the cooling channels was thereafter polished employing ½ micron diamond grit on a pitch lap. Following the attainment of the polished optical flat the substrate was provided with a chromium film having a thickness of about 200 angstrom units. The chromium film was deposited to aid in the adhesion of the silver film which forms the layer of metal of high reflectivity. The chromium film was deposited on the polished substrate using vacuum evaporation. After the chromium film of 200 angstrom units in thickness was deposited on the polished substrate, a silver film having a thickness of about 3,000 angstrom units was immediately deposited over the chromium film, said silver film having been evaporated at the rate of about 1,500 angstroms per second. Thereafter, lanthanum fluoride was also evaporated until a film having a thickness of 1,000 angstrom units was deposited to cover the silver surface. All these operations were carried out consecutively in the same vacuum vessel.

A second smaller mirror was prepared in the same manner except that the chromium film was omitted and directly upon the polished surface a silver film having a thickness of 2,400 angstroms was deposited by vacuum evaporation after the substrate and coating materials were baked sufficiently to eliminate water vapor from the system as well as the components. Thereafter, the absorptivity of the mirror was measured at a wavelength of 10.6 microns and was found to be 0.74 percent which is substantially lower than the 1 percent which is the most commonly reported value for silver mirrors.

In a separate duplicate experiment, the silver film was thereafter covered with a lanthanum fluoride film having a thickness of 830 angstrom units and thereafter the absorption was once again measured at 10.6 microns. No measurable difference in the absorption was noted with the lanthanum fluoride film covering the silver film of high reflectivity.

From the foregoing, it is clear that the laser mirror of the present invention combines the advantages of low absorptivity, high thermal conductivity, low weight and low coefficient of thermal expansion. Of prime importance is the low cost of the mirrors since both the material and processing costs are quite low. No problems are envisaged in scaling the mirror to various larger sizes and with utilization of the substrate materials, as described hereinbefore, the mirror will show a high hardness, good thermal stability, and excellent corrosion resistance.

Silicon carbide, reaction bonded silicon carbide, silicon nitride and mixtures thereof can be employed together with a chemically vapor deposited surface of substantially pure silicon carbide. The chemically vapor deposited silicon carbide has been optically polished with the roughness thereof being measured by an independent laboratory resulting in a roughness of about 7 angstroms RMS, the best thus far measured. Thus the silicon carbide is quite useful for both laser mirrors and ultraviolet mirrors, the latter in the range between 500Å and 1000Å. Since single crystal silicon carbide at a wavelength of 500Å scatters about 1% of the light whereas molybdenum scatters about 30%, the utility is obvious.

An example of the foregoing would employ reaction bonded silicon carbide which is pressed into the desired substrate configuration having the associated cooling channels provided therein. This substrate is then fired and becomes the substrate onto which the substantially pure silicon carbide is chemically vapor deposited in a layer of about 1/8 inch in thickness. This material is then polished in the manner set forth hereinbefore. Where the mirror is to be utilized in an ultraviolet application for example at 700Å the normal incident reflectivity is about 40% compared to about 10% for platinum which is erroneously used as a coating for ultraviolet mirrors. It will be appreciated that if the intended usage is a high powered laser mirror, the coatings, as set forth hereinbefore may, where so desired, be employed on the polished chemically vapor deposited silicon carbide coated substrate.

We claim:

1. The method for producing a high power laser mirror, the steps comprising forming a substrate of a refractory composition having a thermal conductivity of at least 2 watts/cm° K., a thermal expansion coefficient of less than $5 \times 10^{-6}/°$ C., a hardness of at least 9 MOH and a density of less than 4 gm/cm$^3$, said material having a density in excess of about 99% of theoretical density, polishing an optical surface on at least one surface of the substrate, depositing a film of a high reflectivity metal on the optical surface, said film having a thickness not in excess of 8,000 angstroms, and depositing a transparent dielectric film of less than 2,000 angstroms in thickness over the metal of high reflectivity.

2. The method of claim 1 in which the polishing is interrupted, a metallic layer of up to 1,000 angstroms in thickness is placed on the surface of the refractory composition undergoing polishing, and thereafter the polishing is continued for producing an optical surface.

3. The method of claim 1 in which the films are deposited by vacuum evaporation.

4. The method of claim 1 in which the refractory composition substrate is selected from the group consisting of silicon carbide, silicon nitride and mixtures thereof.

5. The method of claim 1 in which the metal of high reflectivity is selected from the group consisting of silver, gold, and copper.

6. The method of claim 1 in which the dielectric film is lanthanum fluoride.

7. The method of claim 1 in which the deposition rate is within the range between about 200 angstroms per second and about 3,000 angstroms per second.

8. The method of producing a high power laser mirror, the steps comprising hot pressing a silicon carbide substrate to achieve a density in the substrate in excess of 99% of the theoretical density of silicon carbide, said silicon carbide having a thermal conductivity of at least two watts per centimeter degrees K., a thermal expansion of less than $5 \times 10^{-6}/°$ C. and a hardness of at least 9 MOH, polishing an optical surface on at least one surface of the substrate by lapping the same while employing a ¼ micron diamond abrasive, applying to the optical surface a layer of silver having a thickness of between 1,500 angstroms and 5,000 angstroms, and applying to the silver film thus deposited a dielectric film of lanthanum fluoride having a thickness within the range between about 500 angstroms and about 1,500 angstroms.

9. The method of claim 8 in which a chromium film having a thickness between about 100 angstroms and 500 angstroms is deposited between the substrate and silver film.

10. The method of claim 1 in which the substrate consists essentially of a base having a chemically vapor deposited coating of substantially pure silicon carbide having a thickness of up to about ⅛ inch, which coating is optically polished to a roughness of less than 10Å RMS.

11. The method of making a mirror suitable for use in the 500Å to 1000Å wavelength comprising forming a base of the desired configuration from a material selected from the group consisting of silicon carbide, silicon nitride, mixtures thereof and with additives such as silicon, aluminum or magnesium, said form base having a density of not less than 90% of theoretical chemically vapor depositing a layer of silicon carbide having a thickness of up to ⅛ inch on said base of the desired configuration, and thereafter polishing an optical surface on the chemically vapor deposited silicon carbide, said optical surface having a roughness of less than 10Å R.M.S.

* * * * *